US007397567B2

(12) United States Patent
Kaertner et al.

(10) Patent No.: US 7,397,567 B2
(45) Date of Patent: Jul. 8, 2008

(54) BALANCED OPTICAL-RADIOFREQUENCY PHASE DETECTOR

(75) Inventors: Franz X. Kaertner, Newton, MA (US); Jung-Won Kim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 81 days.

(21) Appl. No.: 11/609,195

(22) Filed: Dec. 11, 2006

(65) Prior Publication Data

US 2008/0024787 A1 Jan. 31, 2008

Related U.S. Application Data

(60) Provisional application No. 60/748,859, filed on Dec. 9, 2005.

(51) Int. Cl.
*G01B 9/02* (2006.01)
(52) U.S. Cl. .................. 356/483; 356/450; 356/459
(58) Field of Classification Search ............. 356/483, 356/459–476, 450
See application file for complete search history.

(56) References Cited

U.S. PATENT DOCUMENTS

2005/0265406 A1* 12/2005 Kaertner et al. ............ 372/30

OTHER PUBLICATIONS

Kim et al., "Femtosecond synchronization of radio frequency signals with optical pulse trains", *Optics Lett.*, 29(17):2076-2078 (2004).
Kim et al., "Balanced optical-microwave phase detectors for optoelectronic phase-locked loops", *Optics Lett.*, 31(24):3659-3661 (2006).
Kim et al., "A balanced optical-RF phase detector", *Paper CTuP5, Conference on Lasers and Electro Optics* (CLEO), Long Beach, CA, May 2006.
International Search Report and Written Opinion of the International Searching Authority for counterpart international application, PCT/US2006/047490, mailed Jun. 11, 2007.
Kim, J., et al., "Large-Scale Timing Distribution and RF-Synchronization for FEL Facilitites," Aug. 29, 2004, XP002356005 (retrieved from http://www.JACoW.org on Nov. 25, 2005) (cited in the International Search Report for PCT/US2006/047490).
McFerran, J. J., et al., "Low-Noise Synthesis of Microwave Signals from an Optical Source, " Electronics Letters, IEE Stevenage, GB, vol. 41, No. 11, May 26, 2005, pp. 650-651, XP006024155, ISSN: 0013-5194 (cited in the International Search Report for PCT/US2006/047490).
Kim, J., et al., "Femtosecond Synchronization and Stabilization Techniques," Proceedings of FEL, Bessy, 2006, pp. 287-290, XP002434020.

* cited by examiner

*Primary Examiner*—Tarifur R Chowdhury
*Assistant Examiner*—Michael Lapage
(74) *Attorney, Agent, or Firm*—Modern Times Legal; Robert J. Sayre (57) ABSTRACT

A balanced optical-RF phase detector for the extraction of low-jitter radiofrequency (RF) signals from optical pulse trains is demonstrated. The extraction of the low-jitter radiofrequency signals is based on the precise phase detection by use of a differentially biased Sagnac-loop interferometer and synchronous detection. The phase-error signal from this balanced optical-RF phase detector, which is robust against drifts and photodetector nonlinearities, is used to regenerate low-jitter radiofrequency signals from optical pulse trains. Alternatively, the phase-error signal is used to generate a low-jitter optical pulse train, synchronized with a master radiofrequency signal or to synchronize multiple modelocked lasers with each other.

25 Claims, 9 Drawing Sheets

BALANCED OPTICAL-RADIOFREQUENCY PHASE DETECTOR

RELATED APPLICATIONS

This application claims the benefit of U.S. Provisional Application No. 60/748,859, filed Dec. 9, 2005, the entire teachings of which are incorporated herein by reference.

GOVERNMENT SUPPORT

The invention was supported, in whole or in part, by a grant under Contract No. N00014-02-1-0717 from the Office of Naval Research. The Government has certain rights in the invention.

BACKGROUND

Precision timing distribution is important for future accelerator facilities and, in particular, for precise synchronization between low-level radiofrequency (RF) systems in such facilities as well as to the extraction of microwave signals from optical clocks.

Seeding of free-electron lasers operating in the extreme ultraviolet and soft X-ray regime with radiation generated via high harmonics from noble gases may result in a fully coherent X-ray laser. For seeding of such large-scale facilities spanning over several hundreds meters, it is critical to synchronize lasers and radiofrequency systems with low (preferably sub-femtosecond range) timing jitter in a long-term stable arrangement.

To achieve this synchronization, the pulse repetition rate of an optical master oscillator implemented as a mode-locked laser is stabilized to a frequency standard or to an ultra-low noise microwave oscillator that is clocking the facility. The pulse train is distributed to all critical sub-systems by use of timing-stabilized fiber links; i.e., the pulse trains leaving different fiber links are synchronous. The radiofrequency or optical sub-systems are then synchronized to the pulse trains at the fiber outputs.

It has been shown that the extraction of a microwave signal from an optical pulse train emitted by a mode-locked laser using direct photo-detection is limited in precision by excess phase noise [see E. N. Ivanov, et al., "Analysis of Noise Mechanisms Limiting the Frequency Stability of Microwave Signals Generated with a Femtosecond Laser," IEEE J. Sel. Top. Quant. Elec. 9, 1059-1065 (2003), and A. Bartels, et al., "Femtosecond-Laser-Based Synthesis of Ultrastable Microwave Signals from Optical Frequency References," Optics Letters 30, 667-669 (2005)].

The origin of this excess noise has been identified as amplitude-to-phase conversion in the photo-detection process, beam-pointing variations, and pulse distortions by photodetector nonlinearities. In addition to this excess phase noise and timing jitter by photodetector nonlinearities, the long-term synchronization stability is limited by the temperature dependence of semiconductor photodiodes. Thus, a new synchronization scheme to avoid these problems is highly desirable.

The great potential of mode-locked lasers for generating ultra-low-jitter radiofrequency signals has been recognized. Recently, the extraction of a radiofrequency signal from an optical pulse train emitted by a mode-locked laser using direct photo-detection has been shown to be limited in precision by excess phase noise. The major origin of this excess noise has been identified to be the amplitude-to-phase (AM-to-PM) conversion in the photodetector. The inventors have measured the AM-to-PM conversion factor at ranges from 1 to 10 picoseconds per milliwatt (ps/mW), depending on the bias voltage and diode types. The intensity noise of the laser can be converted into a significant amount of phase noise by this conversion process. The inventors previously demonstrated a scheme to avoid this conversion by transfer of timing information in the optical domain based on a free-space Sagnac interferometer, as described in US Patent Application Publication No. 2005/0265406 A1.

SUMMARY

Optical-radiofrequency phase detection is performed by detecting a first portion of an optical pulse train and generating a first synchronous electrical detection signal. A second portion of the optical pulse train is directed into a differentially biased Sagnac-loop interferometer where subparts of the second portion circulate in opposite directions. The Sagnac-loop interferometer includes a phase modulator for modulating the phase of the counter-propagating subparts of the optical pulse train. The phase modulator is governed by a radiofrequency signal. An amplitude-modulated optical pulse train is emitted from the Sagnac-loop interferometer and detected, generating a second synchronous electrical detection signal. The second electrical detection signal is synchronously detected with the help of the first detection signal in a double-balanced mixer, and the amplitude modulation of the second detection signal is converted into an electrical signal that is proportional to the phase offset between the optical pulse train and the radiofrequency signal.

The phase-error signal then either modulates a voltage-controlled oscillator in the production of the radiofrequency signal (where the radiofrequency signal is aligned with a master laser source) or modulates a mode-locked laser (where the optical pulse train is aligned with a master radiofrequency signal).

As a first experimental demonstration based on this balanced optical-RF phase detector, sub-10-femtosecond relative timing jitter between the extracted radiofrequency signal and the optical pulse train is demonstrated. This scheme is scalable in its phase detection sensitivity to sub-femtosecond precision by increasing optical power and/or modulation depth in the fiber loop.

BRIEF DESCRIPTION OF THE DRAWINGS

FIG. 4 is a schematic illustration of an apparatus for synchronizing two lasers using a pair of balanced optical-RF phase detectors.

The foregoing and other features and advantages of the invention will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
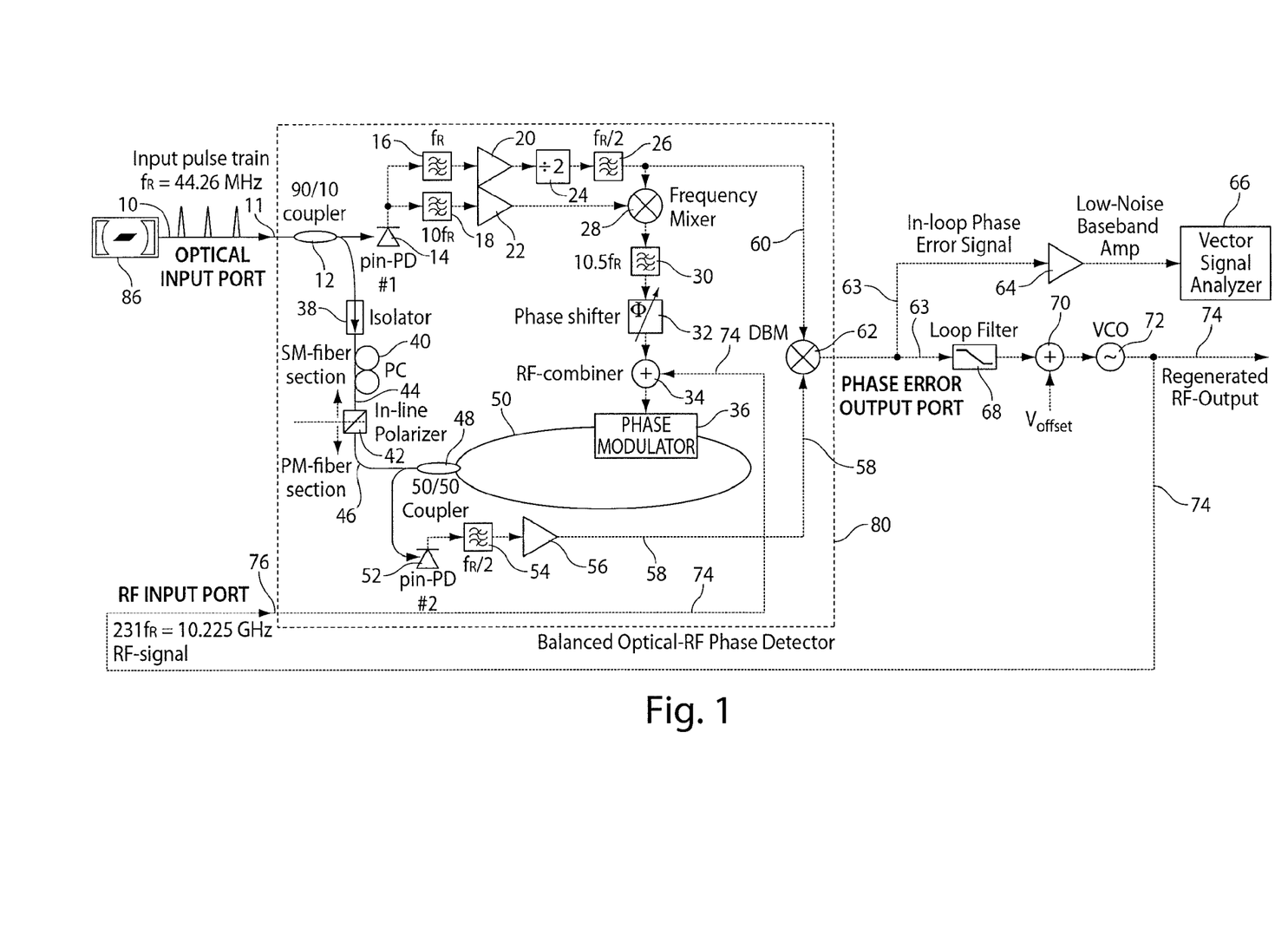
FIG. 1 is a schematic illustration of an apparatus for radiofrequency (RF) signal regeneration from an optical pulse train using a balanced optical-RF phase detector.

A schematic illustration of an apparatus including a balanced optical-RF phase detector 80 for radiofrequency-signal regeneration from an optical pulse train 10 is provided in FIG. 1, wherein optical fiber for optical pulse transmission is shown as solid lines, while electrically conductive pathways for electrical signal transport are shown as dotted lines. A stretched-pulse Er-doped fiber laser with a repetition rate, $f_R$, of 44.26 megaHertz (MHz) is used as the optical pulse source 86. A 90/10 coupler taps 10% of the optical pulse train 10 from the optical pulse source 86 to a first branch where it is received by a first p-doped-intrinsic-n-doped (PIN) photodetector 14 to generate a synchronous electronic detection signal.

A portion of the electronic detection signal generated by the photodetector 14 is processed to produce an electrical signal 60 with half the repetition rate ($f_R/2$) of the fundamental repetition rate of the pulse train 10 from the optical pulse source 86. This comparatively low frequency ($f_R/2$) is produced by passing a portion of the electronic detection signal through a band-pass filter 16 that filters out all frequencies except the fundamental repetition rate, $f_R$, of the laser 86; then through an amplifier 20; then through a frequency divider 24 for halving the frequency of the detection signal; and then through a band-pass filter 26 for passing the detection signal at half the repetition-rate frequency, $f_R/2$.

A second portion of the electronic detection signal is passed through a band-pass filter 18 that transmits only a frequency that is a multiple of the fundamental repetition rate, $f_R$, of the optical pulse train 10 (in this case, the frequency is 10 $f_R$) and an amplifier 22. The two portions of the electronic detection signal (at 10 $f_R$ and at $f_R/2$) are combined in a frequency mixer 28 and the sum frequency (10.5 $f_R$) passes through a band-pass filter 30. Use of a frequency at $(n+1)/2$, where n is an even integer, rather than $f_R/2$ reduces the necessary length of the fiber loop 50, which is further discussed below. The electronic signal at 10.5 $f_R$ is then passed through a phase shifter 32 that adjusts the phase of the electronic signal to thereby adjust the phase of the optical signal in the fiber loop 50 so as to synchronize the electronic detection signals at the double-balanced mixer 62. After passing through the phase shifter 32, the electronic signal is then combined with a higher-frequency radiofrequency signal 74 (at 231 $f_R$ in this embodiment). Generation of the radiofrequency signal 74 also is further discussed below.

The remainder (90%) of the input pulse train 10 is sent through an isolator 38 that transmits optical pulses only in one direction (preventing the return of pulses back to the laser 86). The pulse train, optionally, is then sent through a polarization controller 40 that changes the polarization of the optical pulse train in a single-mode fiber section 44. The pulse train then passes through an inline polarizer 42 that ensures that only optical pulses with a particular polarization pass through to a polarization-maintaining fiber section 46 (to optimize operation of the Sagnac fiber loop 50). The polarization control provided by the polarization controller 40 and polarizer 42 can promote peak performance (for some applications) by helping to avoid birefringence in the loop 50 or in the modulator 36 as a consequence of polarization-dependent dispersion in the fiber.

The optical pulse train is directed through a 50/50 fiber coupler 48 that transmits the pulse train 10 into then polarization-maintaining (PM) fiber Sagnac-loop interferometer 50, which includes a phase modulator 36 in the optical path. The fiber coupler 48 splits the optical pulse train 10 into substantially equal subparts directed in clockwise and counterclockwise rotation about the fiber loop 50. The phase modulator 36 is positioned where an optical delay between the counter-propagating pulses is set to $\Delta t_{delay}=1/(2\times10.5\ f_R)$. I.e., the delay of the counter-clockwise propagating pulse is half the period in relation to the clockwise-propagating pulse, thereby shifting the bias by a half phase across the clockwise- and counter-clockwise-propagating pulses. Accordingly, this time delay assures that the two counter-propagating pulses experience opposite phase modulations. The frequency component from the radiofrequency signal 74 provides additional phase modulation, that is converted into amplitude modulation of the pulses leaving the fiber loop 50 (shifting one up and one down on the cosinusoidal curve) unless the pulses are synchronized to the zero-amplitude crossings of the radiofrequency electrical signal 74.

A voltage-controlled oscillator (VCO) 72 (e.g., model DRO-10.225 from Poseidon Scientific Instruments of Fremantle, Western Australia) has a center frequency of 10.225 GHz, which corresponds to the 231st harmonic of the fundamental repetition rate. The voltage-controlled oscillator 72 generates a radiofrequency electrical signal 74 with a frequency that varies dynamically as the phase-error signal 63 varies until the radiofrequency electrical signal 74 is synchronized to the optical pulse train 10 generated by the master mode-locked laser oscillator 86 (i.e., with matched zero-amplitude crossings of the sinusoidal wave functions for both the optical pulse train 10 and the radiofrequency electrical signal 74).

If there is an imbalance in the fiber loop 50 (i.e., the counter-propagating pulses in the loop are out of phase), then the coupler 48, directs an output pulse train from the fiber loop 50 to a second PIN photodector 52, which generates an electrical detection signal that is then directed to a band-pass filter 54 that passes only a frequency at half the fundamental repetition rate, $f_R/2$ of the optical pulse train 10, which then is passed through a low-noise amplifier 56. The amplitude of the electrical signal 58 generated by the photodetector 52 is proportional to the phase error between the pulse train 10 and the radiofrequency signal 74 from the voltage-controlled oscillator 72.

This amplitude modulation of the electrical signal 58 is converted to the baseband phase-error signal 63 by synchronous detection of the electrical signals 58 and 60 with a double-balanced mixer 62. The double-balanced mixer 62 multiplies the frequencies of the signals 58 and 60 to produce a phase-error signal 63. With the subsequent processing, described below, this phase-error signal 63 drives the voltage-controlled oscillator 72 to tune its frequency until the radiofrequency signal 74 is synchronized with the optical pulse train 10.

After leaving the balanced optical-RF phase detector 80, the phase-error signal 63 is filtered by a loop filter 68 that rejects the high-frequency component of the phase-error signal 63 and processes the low-frequency component. A voltage offset 70 subtracts a baseline (or noise) level from the signal 63. The subtracted baseline level is that which is generated by the double-balanced mixer 62 when the phases are aligned (the subtraction of which will thereby produce a zero-voltage signal upon synchronization of the signals). The processed signal 63 is then used to modulate the generation of the radiofrequency electrical signal 74 in the low-noise voltage-controlled oscillator 72. A portion of the radiofrequency electrical signal 74 is extracted out of the system, while another portion of the radiofrequency signal is directed back into the balanced optical-radiofrequency phase detector 80 to modulate the phase of the optical pulse in the Sagnac fiber loop 50. When the radiofrequency signal 74 generated by the voltage-controlled oscillator 72 is locked with the input pulse train 10 (i.e., with aligned zero-amplitude crossings), the output from the double-balanced mixer 62 is "balanced" since the amplitude modulation of the output signal from the fiber loop is zero. Long-term-stable locking between the laser 86 and the voltage-controlled oscillator 72 over several hours has been demonstrated, limited only by the thermal expansion of the fiber loop 50 rather than thermal drifts in a microwave mixer.

Figure 2:
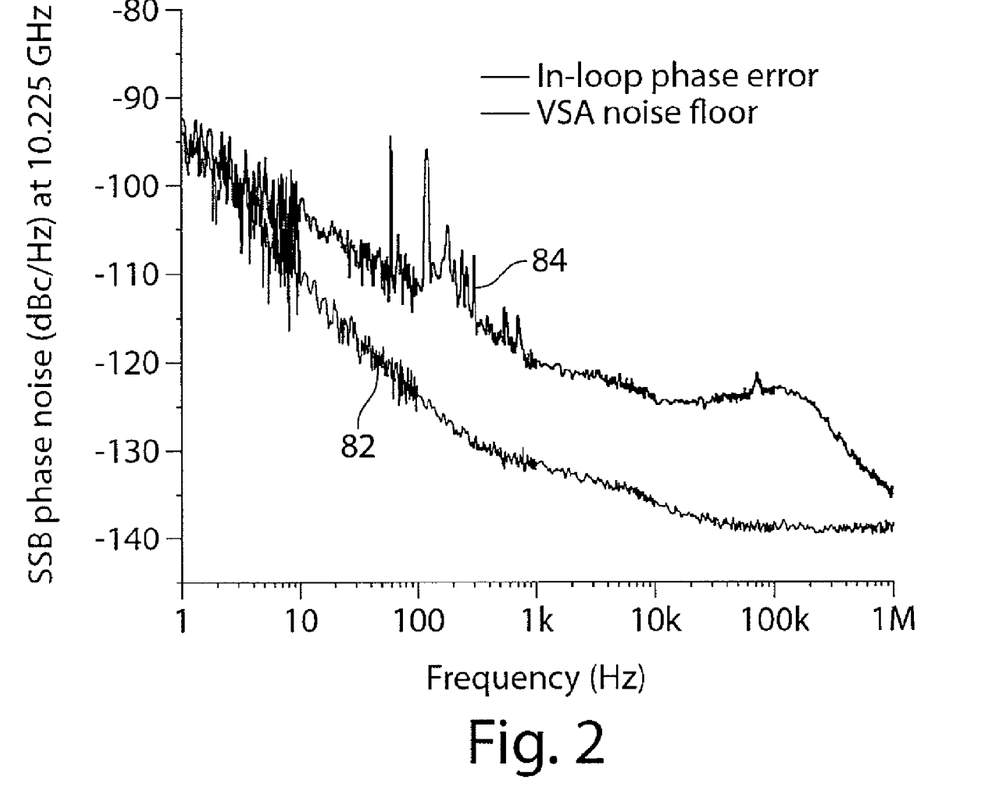
FIG. 2 charts single-sideband, in-loop phase noise spectra at 10.225 GHz using the apparatus of FIG. 1, illustrating in-loop phase noise when the optical and radiofrequency signals are locked with the upper line and the vector signal analyzer noise floor with the lower line.

The measured in-loop phase error measured by the vector signal analyzer 66 based on the voltage signal 63 from the phase detector 80 and converted into single-sideband (SSB) phase noise at 10.225 GHz is charted in FIG. 2. The upper line 84 shows the in-loop phase noise when the optical pulse train 10 and the radiofrequency electrical signal 74 are locked. The lower line 82 is the noise floor from the voltage signal analyzer 66. This measurement shows that the integrated in-loop jitter is 8.8 fs±2.6 fs from 1 Hz to 1 MHz.

The above example demonstrates use of the balanced optical-RF phase detector 80 for extracting low-jitter radiofrequency signals from optical pulse trains. Specifically, sub-10-femtosecond timing jitter measured from 1 Hz to 1 MHz between the radiofrequency signal and an optical pulse train was demonstrated. This apparatus is further scalable to suppress the relative timing jitter between an optical pulse train and an extracted radiofrequency signal to the sub-femtosecond regime. The apparatus is also insensitive to the amplitude noise of both the optical-pulse source as well as that of the microwave voltage-controlled oscillator.

Figure 3:
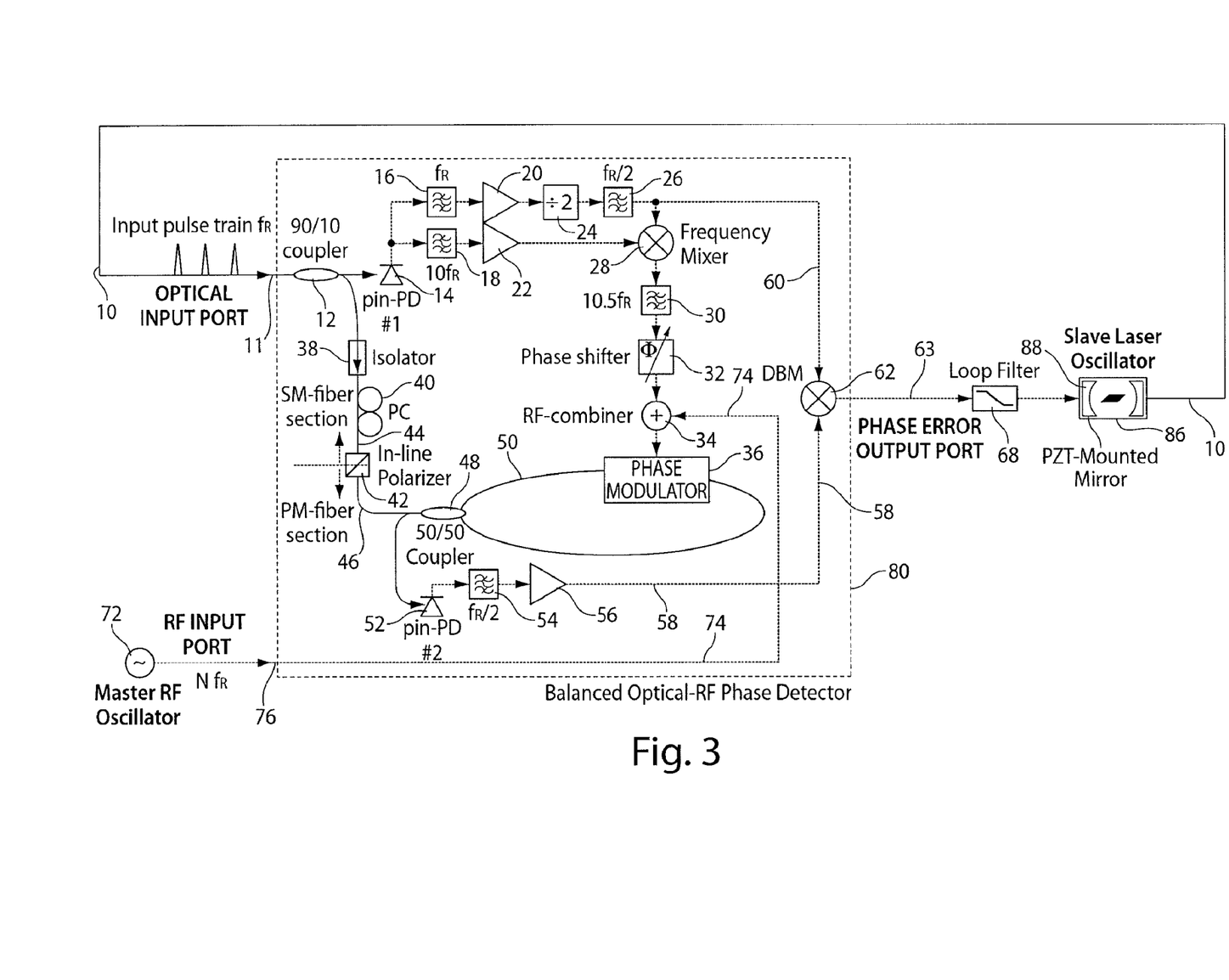
FIG. 3 is a schematic illustration of an apparatus for synchronizing a mode-locked laser to a master radiofrequency oscillator using a balanced optical-RF phase detector.

In the apparatus of FIG. 3, the mode-locked laser 86 and the radiofrequency oscillator 72 are exchanged (in comparison with the above-described apparatus of FIG. 1). Accordingly, in this embodiment, the mode-locked laser 86 is inversely synchronized to the master radiofrequency oscillator 72. The mode-locked laser 86 includes a piezoelectric-mounted mirror 88 that is displaceable to shorten or lengthen the cavity in the mode-locked laser 86 as a function of the voltage of the phase-error electrical signal generated by the double-balanced mixer 62.

In the apparatus of FIG. 4, concepts embodied in the apparatus of FIGS. 1 and 3 are combined, enabling the synchronization of two lasers 86 and 86' with extremely low residual jitter, which is believed to previously have been recognized only with all-optical techniques. The corresponding components of the apparatus associated with the second laser 86' use the same reference numbers as their counterparts in the apparatus associated with the first laser 86, except that an accent, ', is added when referring to components in the second apparatus.

In another application, the balanced optical-RF phase detector, described above, is used to synchronize/regenerate an optical clock signal for electronic-photonic integrated circuits (EPICs). In this embodiment, the balanced optical-RF phase detector is fabricated as an integrated electronic-photonic integrated circuit (EPIC) using high-index contrast material systems (for example, a silicon waveguide with $Si_3N_4$ or $SiO_2$ cladding or a waveguide with a $Si_3N_4$ core and $SiO_2$ cladding) for fabrication of the Sagnac-loop interferometer, Si-modulators, Si— or Si/Ge-photodetectors and low- and high-speed complementary metal-oxide-semiconductors (CMOS) or Si/Ge-heterostructure bipolar transistor circuits including the voltage-controlled oscillator. This application enables a wide variety of novel optoelectronic circuits, such as implementing the functionalities described, above, with respect to the apparatus of FIGS. 1, 3 and 4 using a compact and inexpensive integrated technology. Furthermore, this application enables the optical clock distribution (i.e., transmitting a synchronized optical signal that has the clock information for the processors or individual circuits) and regeneration on high-speed electronic chips and computer systems, high-speed analog-to-digital conversion and signal processing systems in general.

In the following exemplification of these methods, long-term synchronization was demonstrated between two 10.225-GHz microwave signals at +10 dBm referenced to a 44-MHz repetition rate mode-locked fiber laser using balanced optical-microwave phase detectors. The out-of-loop performance between two optoelectronic phase-locked loops (PLLs) using balanced optical-microwave phase detectors was measured. The measurement result shows 12.8 fs relative jitter between two 10.225-GHz microwave signals integrated from 10 Hz to 10 MHz. In addition, the long-term drift measurement shows that the drift in microwave signal extraction is within 50 fs over one hour time scale. Note that the long-term measurement is mainly limited by the drift of the mixer and amplifier used in the out-of-loop characterization setup, which drifts up to 50 fs even when the temperature of the characterization setup is actively stabilized.

Figure 5:
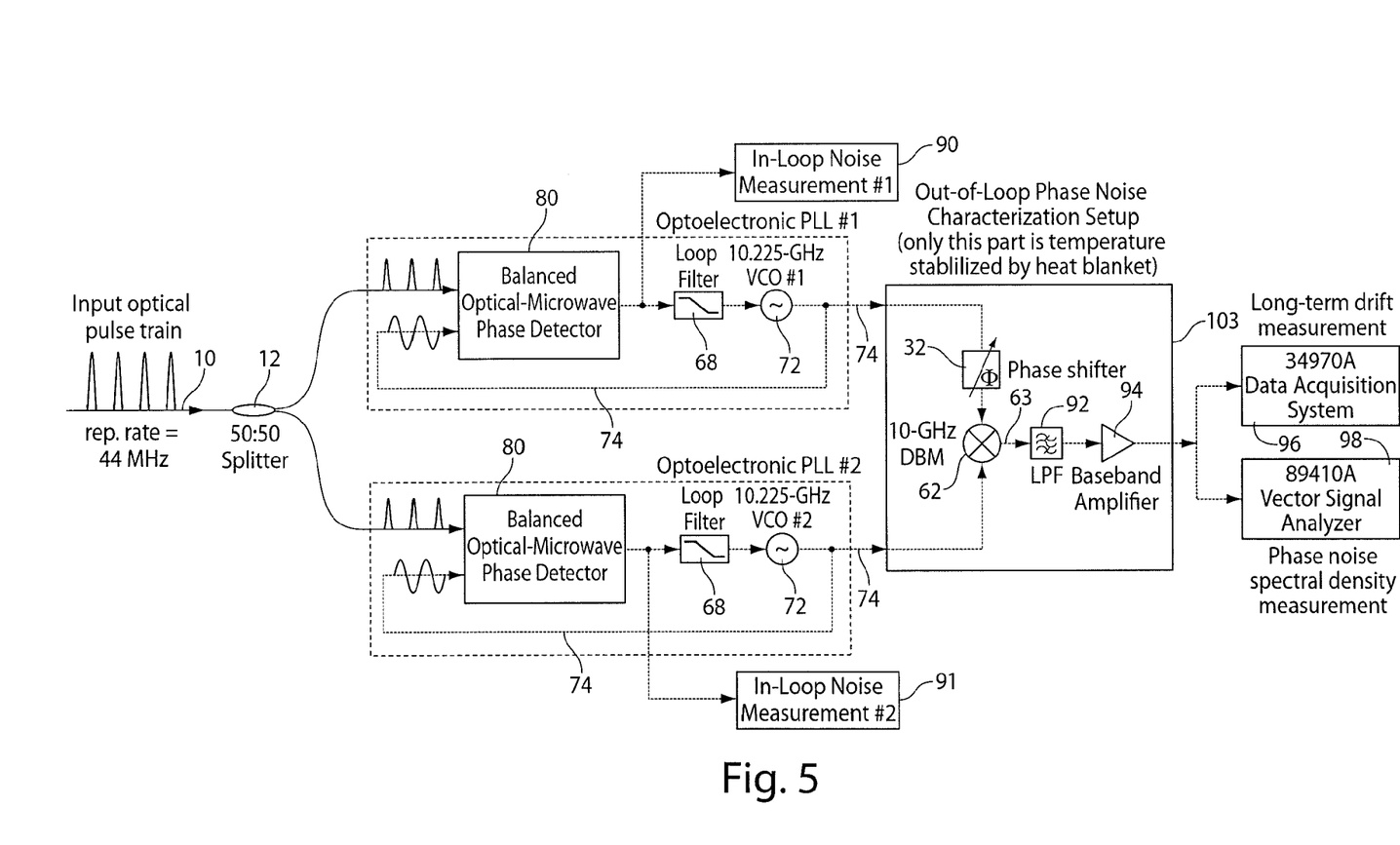
FIG. 5 shows an experimental apparatus for long-term out-of-loop relative timing jitter measurement between two microwave signals referenced to a mode-locked laser.

FIG. 5 shows the schematic of the experimental setup for long-term out-of-loop relative timing jitter measurements between the two 10.225-GHz microwave signals 84 referenced to a 44-MHz, 1550-nm Er-doped fiber mode-locked laser. Two nearly identical optoelectronic phase-locked loops 100 and 102 based on balanced optical-microwave phase detectors 80 were built with 10.225-GHz voltage-controlled oscillators 72. The input optical power to each phase detector 80 is 5 mW, and +4 dBm of output power from the voltage-controlled oscillator 72 is used to close the phase-locked loop 100/102. From each voltage-controlled oscillator 72, +10 dBm of 10.225-GHz microwave signal 74 can be extracted. To evaluate the out-of-loop relative timing jitter between the two extracted microwave signals 74, the outputs 74 from the locked voltage-controlled oscillators 72 were mixed in quadrature in the double-balanced mixer 62. The baseband phase-error signal 63 is filtered with a low-pass filter 92, amplified by a low-noise amplifier 94, and monitored by a vector signal analyzer 98 for spectral phase noise density measurements and by a data acquisition system 96 for long-term drift measurements. The resolution of the out-of-loop characterization was about 0.8 fs at 10.225 GHz, which was determined by using two correlated microwave signals generated by a microwave signal generator and a splitter. Note that only the out-of-loop mixer was temperature-stabilized to enable a long-term measurement, while both phase-locked loops 100 and 102 were not temperature-stabilized.

Figure 6:
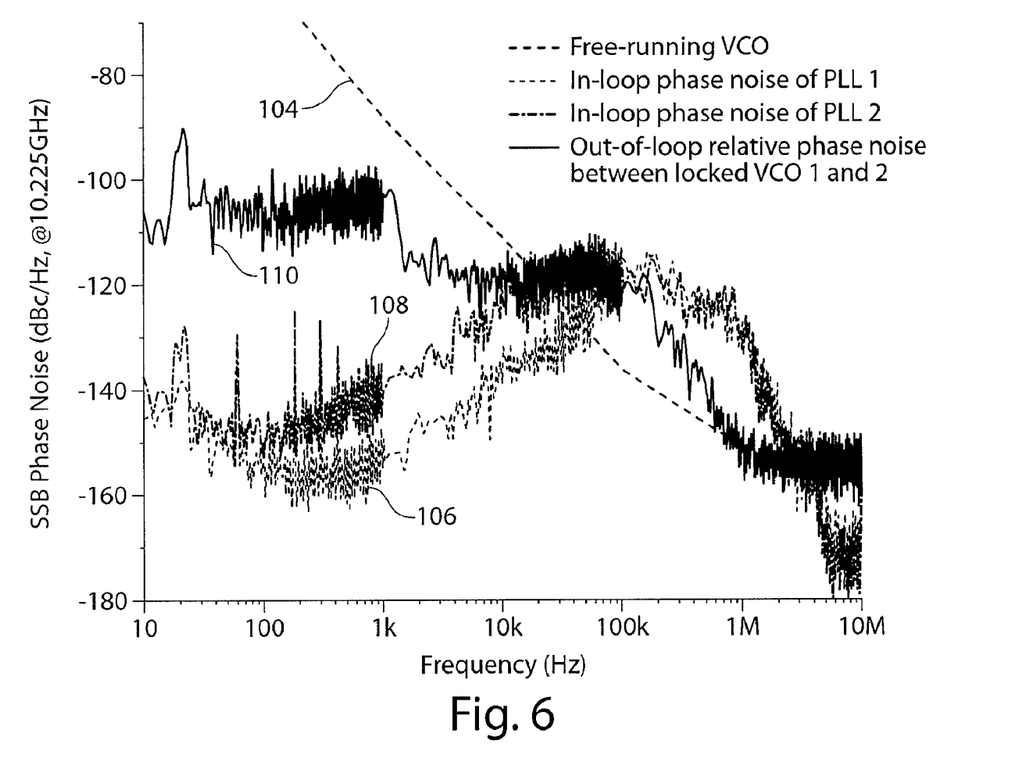
FIG. 6 shows the phase noise spectra at 10.225 GHz from 10 Hz to 10 MHz from the apparatus of FIG. 5.
Figure 7:
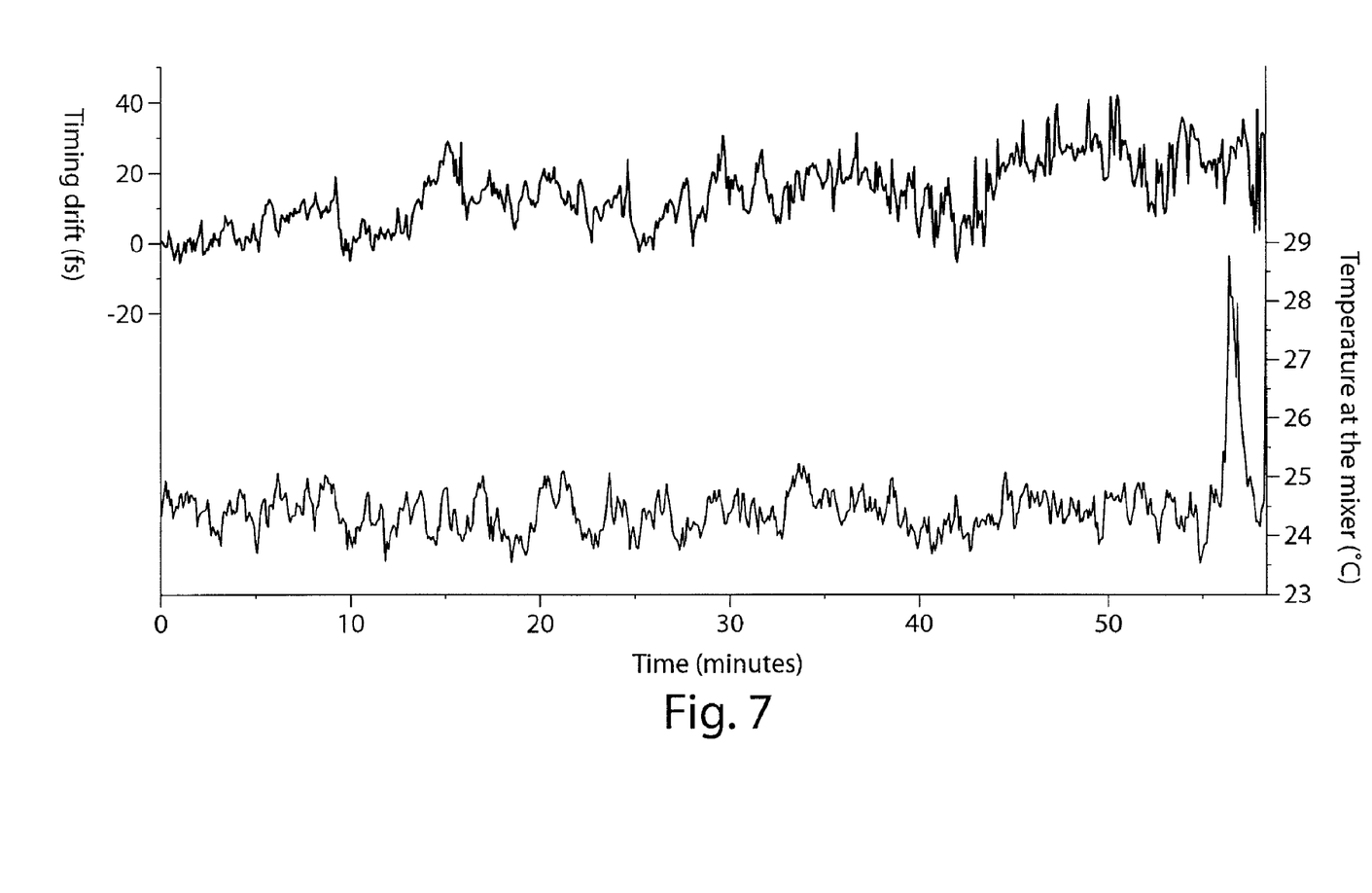
FIG. 7 shows long-term out-of-loop drift measurement between two locked voltage-controlled oscillators in the apparatus of FIG. 5.
Figure 8:
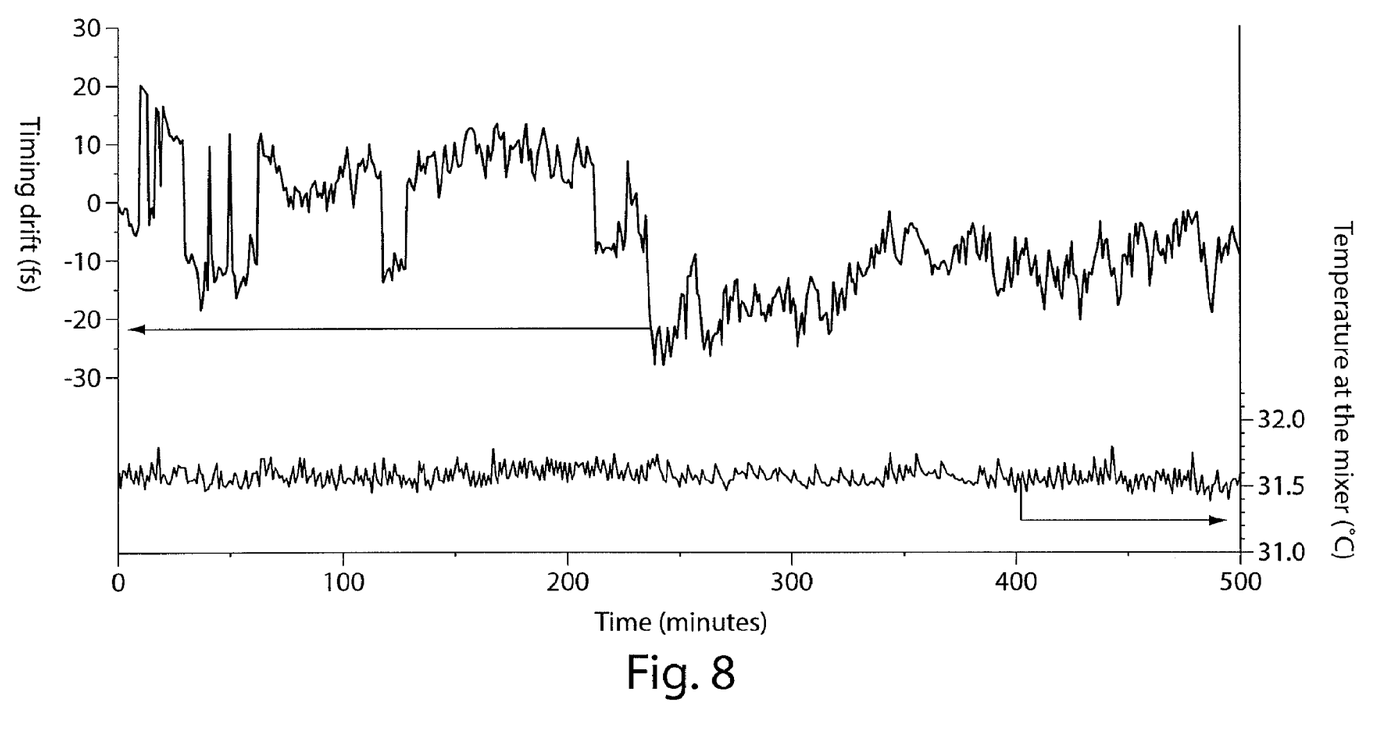
FIG. 8 shows long-term baseline measurement of the out-of-loop characterization setup in the apparatus of FIG. 5.

FIGS. 6-8 summarize the measurement results. FIG. 6 plots the phase noise spectra at 10.25 GHz from 10 Hz to 10 MHz, including (a) line 104 for the phase noise of the free-running oscillators; (b) line 106 for the in-loop phase noise of the first phase-locked loop 100 (measured with module 90); (c) line 108 for the phase noise of the second phase-locked loop 102 (measured with module 91); and (d) line 110 for the relative phase noise between locked voltage-controlled oscillators 72 in the two loops 100 and 102. FIG. 6 shows that when both voltage-controlled oscillators 72 are locked, the out-of-loop timing jitter between two extracted microwave signals integrated from 10 Hz to 10 MHz is 12.8 femtoseconds.

FIG. 7 shows the long-term timing drift measurement result when both voltage-controlled oscillators 72 were locked, with data taken every five seconds. The relative timing between two microwave signals drifted within 48 femtoseconds over one hour. Note that although there was no temperature stabilization for the phase-locked loops 100 and 102, when hot air was intentionally blown over the entire experimental setup at t=57 minutes (which caused a temperature increase of about 5° C.), the timing was immune to such temperature change.

In fact, the baseline measurement in FIG. 8 shows that the characterization setup 103, itself may contribute up to 50 femtoseconds drift. To evaluate the out-of-loop characterization setup 103, the same 10.225-GHz signal was applied to both mixer inputs and measured the timing drift over 500 minutes. The data was taken over one-minute intervals. Even though the temperature of the mixer was stabilized within 1° C., up to 50 fs drift was observed. Therefore, the drift measurement result in FIG. 8 was already limited by the characterization setup 103, itself.

In summary, the long-term stable microwave signal extraction from a mode-locked laser using balanced optical-microwave phase detectors is demonstrated. The relative out-of-loop timing jitter integrated from 10 Hz to 10 MHz was 12.8 femtoseconds, and the drift was within 50 femtoseconds in one hour.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/20^{th}$, $1/10^{th}$, $1/5^{th}$, $1/3^{rd}$, $1/2$, etc., or by rounded-off approximations thereof, within the scope of the invention unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. The contents of all references, including patents and patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

What is claimed is:

1. A method for optical-radiofrequency phase detection, the method comprising:
    a) generating an optical pulse train;
    b) generating a radiofrequency electrical signal;
    c) detecting a portion of the optical pulse train and generating a first synchronous electrical detection signal;
    d) directing a second portion of the optical pulse train into a differentially biased Sagnac-loop interferometer;
    e) modulating the phase of the second portion of the optical pulse train in the differentially biased Sagnac-loop interferometer as a function of the frequency of the radiofrequency electrical signal;
    f) detecting an amplitude-modulated output of the Sagnac-loop interferometer and generating a second synchronous electrical detection signal; and
    g) synchronously detecting the second electrical detection signal with the help of the first electrical detection signal and generating a phase-error electrical signal having an amplitude proportional to the phase difference between the optical pulse train and zero-amplitude crossings of the radiofrequency electrical signal.

2. The method of claim 1, further comprising:
    h) using the phase-error electrical signal to govern an oscillator in generating the radiofrequency electrical signal; and
    i) using a portion of the radiofrequency electrical signal to govern the modulation of the phase of the optical pulse train in the differentially biased Sagnac-loop interferometer.

3. The method of claim 2, wherein steps (a)-(i) are performed in a master apparatus; the method further comprising:
    j) delivering a second portion of the radiofrequency electrical signal to a slave apparatus;
    k) repeating steps (a)-(g) in the slave apparatus, wherein the radiofrequency electrical signal used in step (b) in the slave apparatus is the second portion of the radiofrequency electrical signal in the first apparatus;
    l) using the radiofrequency electrical signal to govern the modulation of the phase of the second portion of the optical pulse train in the differentially biased Sagnac-loop interferometer in the slave apparatus; and
    m) using the phase-error electrical signal generated in the slave apparatus to govern a mode-locked laser in generating the optical pulse train in the slave apparatus.

4. The method of claim 1, further comprising:
    h) using the radiofrequency electrical signal to govern the modulation of the phase of the second portion of the optical pulse train in the differentially biased Sagnac-loop interferometer; and
    i) using the phase-error electrical signal to govern a mode-locked laser in generating the optical pulse train.

5. The method of claim 1, wherein the steps are performed in an integrated electronic-photonic integrated circuit.

6. The method of claim 5, further comprising utilizing the electronic-photonic integrated circuit for optical clock distribution on electronic chips or boards.

7. An apparatus for synchronizing an optical pulse train and a radiofrequency electrical signal comprising:
    a) a mode-locked laser for generating the optical pulse train;
    b) an oscillator for generating the radiofrequency electrical signal; and
    c) a balanced optical-radiofrequency phase detector comprising:
        i) a first optical coupler positioned and configured to split the optical pulse train from the mode-locked laser into a first and second portion of the optical pulse train;

ii) a first detector positioned and configured to receive the first portion of the optical pulse train and to generate a first electrical detection signal in response;

iii) a Sagnac-loop interferometer;

iv) a second optical coupler positioned and configured to direct the second portion of the optical pulse train into the Sagnac-loop interferometer;

v) a phase modulator mounted in the Sagnac-loop interferometer for modulating the phase of the second portion of the optical pulse train as a function of the frequency of the radiofrequency electrical signal;

vi) a second detector positioned and configured to receive the second portion of the optical pulse train emitted from the Sagnac-loop interferometer and to generate a second electrical detection signal in response; and vii) a double-balanced mixer positioned and configured to receive the first and second electrical detection signal and to generate a phase-error electrical signal that is a function of the comparison.

8. The apparatus of claim 7, wherein the oscillator is positioned and configured to receive the phase-error electrical signal from the double-balanced mixer and to adjust the frequency of the generated radiofrequency electrical signal as a function of the voltage of the phase-error electrical signal.

9. The apparatus of claim 8, wherein the phase modulator is positioned and configured to receive the radiofrequency electrical signal and to modulate the phase of the second portion of the optical pulse train in the Sagnac-loop interferometer.

10. The apparatus of claim 7, wherein the mode-locked laser is positioned and configured to receive the phase-error electrical signal from the double-balanced mixer and to adjust the frequency of the generated optical pulse train as a function of the voltage of the phase-error electrical signal.

11. The apparatus of claim 7, further comprising optical fiber joining:
the mode-locked laser with the first optical coupler;
the first optical coupler with the first detector;
the first optical coupler with the second optical coupler; and
the second optical coupler with the second detector.

12. The apparatus of claim 11, wherein the Sagnac-loop interferometer comprises optical fiber.

13. The apparatus of claim 7, further comprising:
a first electrically conductive pathway electrically coupled with the first detector; and
a second electrically conductive pathway electrically coupled with the first detector.

14. The apparatus of claim 13, further comprising a frequency divider in the first electrically conductive pathway.

15. The apparatus of claim 14, where the frequency divider is configured to divide the frequency of the electrical detection signal in half.

16. The apparatus of claim 14, further comprising a band-pass filter in the first electrically conductive pathway between the frequency divider and the first detector.

17. The apparatus of claim 16, wherein the band-pass filter in the first electrically conductive pathway is configured to pass a frequency at the fundamental repetition rate of the mode-locked laser and to block other frequencies.

18. The apparatus of claim 14, further comprising a band-pass filter in the second electrically conductive pathway.

19. The apparatus of claim 18, wherein the band-pass filter in the second electrically conductive pathway is configured to pass a frequency at an integer multiple of the fundamental repetition rate of the mode-locked laser and to block other frequencies.

20. The apparatus of claim 14, further comprising a frequency mixer electrically coupled with the first and second electrically conductive pathways, wherein the frequency mixer is configured to produce an electrical signal having a frequency that is the sum of the frequencies of the electrical signals received from the first and second electrically conductive pathways.

21. The apparatus of claim 20, further comprising an electrically conductive pathway from the frequency mixer to the phase modulator and further comprising a phase shifter in that electrically conductive pathway.

22. The apparatus of claim 21, further comprising a radiofrequency combiner in the electrically conductive pathway from the frequency mixer to the phase modulator, wherein the radiofrequency mixer is also electrically coupled with the oscillator that generates the radiofrequency frequency electrical signal.

23. The apparatus of claim 7, wherein the second optical coupler is configured to split the second portion of the optical pulse train into a pair of counter-propagating optical signals in the Sagnac-loop interferometer.

24. The apparatus of claim 23, wherein the phase modulator is located at a position in the Sagnac-loop interferometer where an optical delay between the counter-propagating pulses is set to $\Delta t_{delay}=1/(2\times 10.5\ f_R)$.

25. The apparatus of claim 7, wherein the balanced optical-radiofrequency phase detector is in the form of an integrated electronic-photonic integrated circuit.

* * * * *